Oct. 8, 1940.  E. W. MILLIMAN  2,217,071
COMBINED PLANTER AND FERTILIZER DROPPER
Filed Jan. 27, 1939
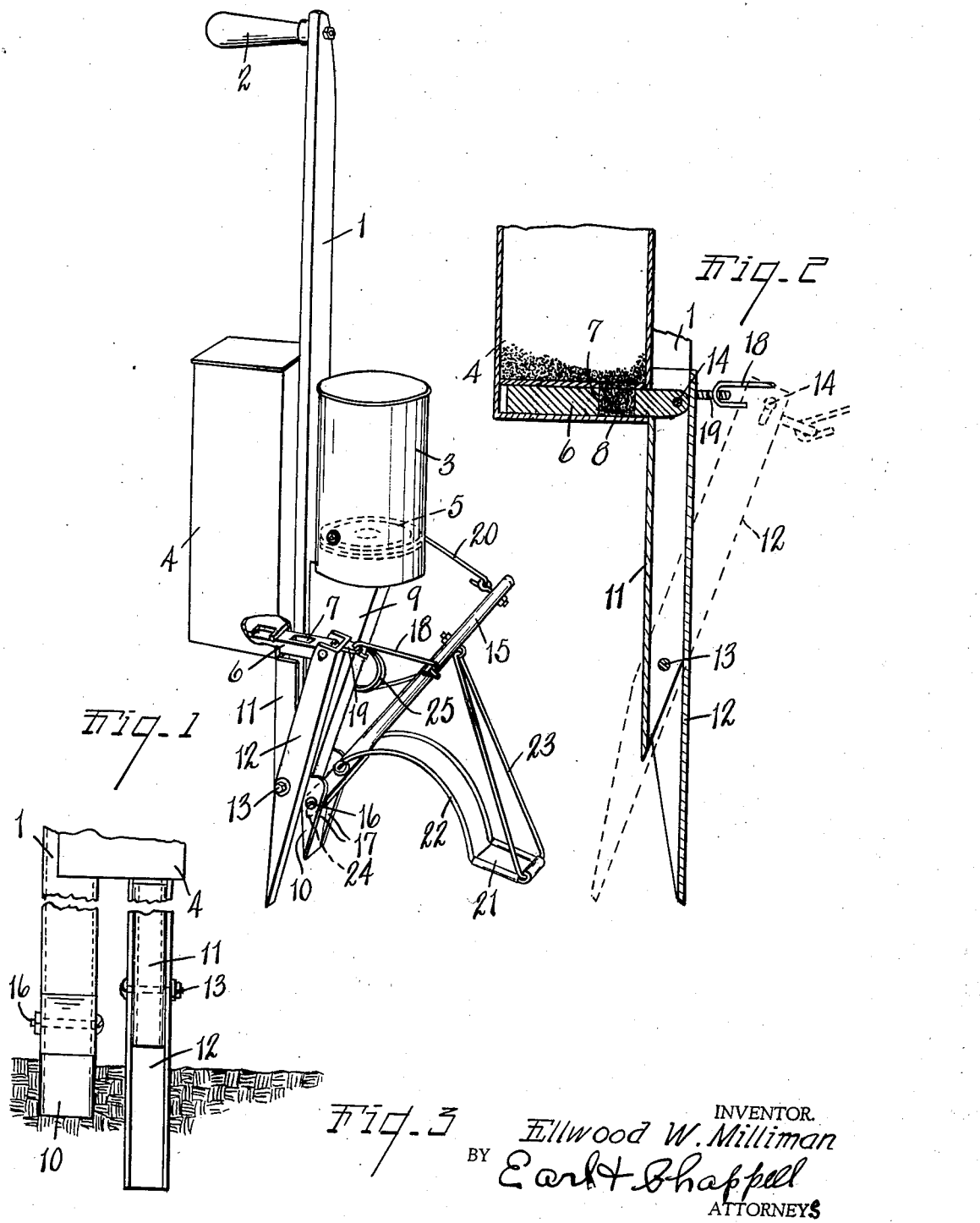
INVENTOR.
Ellwood W. Milliman
BY Earl H. Chappell
ATTORNEYS Patented Oct. 8, 1940

2,217,071

UNITED STATES PATENT OFFICE 2,217,071

COMBINED PLANTER AND FERTILIZER DROPPER

Elwood W. Milliman, Burr Oak, Mich.

Application January 27, 1939, Serial No. 253,028

5 Claims. (Cl. 111—98)

This invention relates to improvements in combined planters and fertilizer droppers.

The main objects of this invention are:

First, to provide a combined hand planter and fertilizer dropper in which the fertilizer is simultaneously deposited with the depositing of seeds and in laterally spaced relation thereto and somewhat below the seeds.

Second, to provide a combined planter and fertilizer distributer having these features in which the fertilizer is distributed and substantially mixed with earth.

Third, to provide a structure of this class which is comparatively simple and economical in structure, light in weight and easy to operate.

Objects relating to details and economies of the invention will appear from the description to follow. The invention is defined and pointed out in the claims.

A preferred embodiment of the invention is illustrated in the accompanying drawing, in which:

Fig. 1 is a perspective view of a combined planter and fertilizer dropper embodying the features of my invention.

Fig. 2 is a fragmentary view partially in vertical section through the fertilizer depositing chute and hopper.

Fig. 3 is a fragmentary diagrammatic view illustrating the laterally spaced relation of the seed and fertilizer depositing means and the relative position of depositing in the ground.

Referring to the drawing, 1 is the staff of a hand planter and 2 the handle thereof. On the front side of the staff I mount the seed hopper 3 and on its rear side the fertilizer hopper 4.

The seed hopper is provided with a seed delivery means designated generally by the numeral 5. This means is indicated by dotted lines only as the details form no part of this invention.

The charge delivering slide 6 of the fertilizer hopper is provided with a pocket 7 open at the top and bottom so that when in one position as shown in Fig. 2 it receives a charge of fertilizer indicated at 8.

The seed hopper is provided with a delivery chute 9 terminating at the planting blade 10.

The fertilizer hopper is provided with a delivery chute comprising the fixed channel member 11 and the coacting swingable channel member 12 which embraces the flanges of the swingable member and is pivoted thereon at 13. This swingable member projects forwardly below the lower end of the fixed member and is adapted when in its normal or closed position to close the lower end of the fixed member as is indicated by dotted lines in Fig. 2, this being the normal or unactuated position of the swingable member.

The charging slide 6 is pivoted at 14 between the flanges of the swingable member so that it is actuated by the swinging thereof and when the swingable member is shown in the position shown by full lines in Fig. 1 and dotted lines in Fig. 2, the charge device is actuated to deliver a charge into the closed chute.

An actuating lever 15 is pivotally mounted at 16 between the flanges 17 of the seed delivery blade and connected by the link 18 to an ear 19 on the swingable chute member 12 and by the link 20 to the seed delivery means 5. This lever is provided with a fulcrum shoe 21 carried by the bowed arms 22 connected to the actuating lever adjacent its lower end and by the brace or strut 23.

In operation of the planter, it is first pushed downwardly so that its planting blade penetrates the earth to the desired depth and the staff is then rocked or swung forwardly. The shoe 21 contacting with the earth causes the actuating lever to swing on its pivot, thereby opening the seed delivery plate 24 on the lower end of the lever 15, also swinging the chute member 12, delivering the charge of seed and also of fertilizer that may be within the chutes.

It will be noted that the fertilizer chute member 12 extends substantially below the tip of the planting blade and is laterally spaced therefrom. Also it will be noted that, with said planting blade 10 embedded in the earth, the lower end of the relatively movable swingable member 12 is actuated through the earth with a swinging or sweeping movement, the two positions being indicated in Fig. 2, which serves to substantially spread the charge of fertilizer and the charge of fertilizer is substantially mixed with the earth that may fall in at the rear of the swingable member as the member 12 swings rearwardly from its closed to fully open position. The charge of fertilizer is in such proximity to the seed that it is available when the plants begin to grow but is not in such position as to burn the young plants or the sprouts and the substantial spreading and mixing of the fertilizer with the earth that results from this delivery means also minimizes the danger of burning.

The spring 25 connected at one end to a fixed part and at its other end to the lever 15 serves to return the lever to its normal chute closing position.

I have illustrated and described my improvements in an embodiment which I have found very practical. I have not attempted to illustrate or describe certain other embodiments or adaptations which I contemplate as it is belived that this disclosure will enable those skilled in the art to embody or adapt my improvements as may be desired.

Having thus described my invention, what I claim as new and desire to secure by Letters Patent is:

1. In a combined planter and fertilizer dropper, the combination with a staff, of seed and fertilizer hoppers arranged on opposite sides of the staff, a seed delivery chute terminating in a planting blade, a seed delivery means for said seed hopper, a fertilizer delivery chute disposed in laterally spaced relation to said seed delivery chute and comprising a fixed member of channel cross section and an opposed swingable member of channel cross section embracing the flanges of said fixed member and pivoted thereto and adapted when swung to one position to close the lower end of the fixed member of the chute, the lower end of said swingable chute member projecting substantially below the lower end of said planting blade and being adapted to make a swinging discharge movement in laterally spaced relation to said planting blade, a fertilizer charge device operatively associated with said fertilizer hopper and pivotally connected to the upper end of said swingable chute member between the flanges thereof, an actuating lever pivoted upon said seed chute planting blade and provided with a discharge plate coacting with said planting blade, and links connecting said actuating lever to said seed delivery means and to said swingable fertilizer chute member.

2. In a combined planter and fertilizer dropper, the combination with a staff, of seed and fertilizer hoppers mounted on said staff, a seed delivery chute terminating in a planting blade, a seed delivery means for controlling the delivery of seeds from said seed hopper to said delivery chute, a fertilizer delivery chute disposed in laterally spaced relation to said planting blade and comprising a fixed member of channel cross section and an opposed swingable member of channel cross section embracing the flanges of said fixed member and pivoted thereto and adapted when swung to one position to close the lower end of the fixed member of the chute, the lower end of said swingable chute member projecting substantially below the lower end of said planting blade and being adapted to make a swinging discharge movement in laterally spaced relation to said planting blade, a fertilizer charge device operatively associated with said fertilizer hopper, and an actuating lever provided with a fulcrum shoe and operatively connected with said seed delivery means, said swingable chute member and said fertilizer charge device, said planting blade being spaced laterally with reference to the plane of swinging movement of said swingable member sufficiently that seed and fertilizer are deposited out of contact with one another.

3. In a combined planter and fertilizer dropper, the combination with a staff, of seed and fertilizer hoppers mounted on said staff, a seed delivery chute terminating in a planting blade, a discharge plate coacting therewith, a seed delivery means for said seed hopper, a fertilizer delivery chute disposed in laterally spaced relation to said seed planting blade and comprising a fixed member and an opposed swingable member pivoted thereto and adapted when swung to one position to close the lower end of the fixed member of the chute, the lower end of said swingable chute member projecting substantially below the lower end of said planting blade and being adapted to make a swinging discharge movement in laterally spaced relation to said planting blade, a fertilizer charge device operatively associated with said fertilizer hopper and connected to the upper end of said swingable chute member, and an actuating lever provided with a fulcrum shoe operatively associated with said plate and operatively connected with said seed delivery means and swingable chute member, said planting blade being spaced laterally with reference to the plane of swinging movement of said swingable member sufficiently that seed and fertilizer are deposited out of contact with one another.

4. In a combined planter and fertilizer dropper, the combination with a staff, of seed and fertilizer hoppers mounted thereon, a seed delivery means including a chute terminating in a planting blade, a fertilizer delivery means comprising a chute disposed in laterally spaced relation to said seed delivery chute, a coacting swingable member pivoted relative to the chute of the fertilizer delivery means, said last named member terminating in a plane substantially below the lower end of the planting blade and being adapted to make a swinging discharge movement in laterally spaced relation to said blade whereby it sweeps through the earth as the fertilizer is discharged, and a fertilizer charge device delivering fertilizer from said fertilizer hopper to said fertilizer delivery chute, and means for actuating said seed delivery means to deliver seed and for simultaneously actuating said fertilizer delivery means to deliver a charge of fertilizer in laterally spaced relation to the point of delivery of the seed, said planting blade being spaced laterally with reference to the plane of swinging movement of said swingable member sufficiently that seed and fertilizer are deposited out of contact with one another.

5. In a combined planter and fertilizer dropper, the combination of seed and fertilizer hoppers, seed delivery means including a chute terminating in a planting blade, and a control member pivoted to said chute, a fertilizer delivery means comprising a chute disposed in laterally spaced relation to said seed delivery chute, a coacting swingable member pivoted relative to the chute of the fertilizer delivery means, said last named member terminating in a plane substantially below the end of the planting blade, and a fertilizer charge device delivering fertilizer from said fertilizer hopper to said fertilizer delivery chute, and means including members connected to said swingable member and to said seed chute control member for actuating said seed delivery means to deliver seed and for simultaneously actuating said fertilizer means to deliver a charge of fertilizer in laterally spaced relation to the point of delivery of the seed.

ELWOOD W. MILLIMAN.